H. COWAN.
TEA BALL.
APPLICATION FILED MAY 13, 1919.
1,313,582.
Patented Aug. 19, 1919.
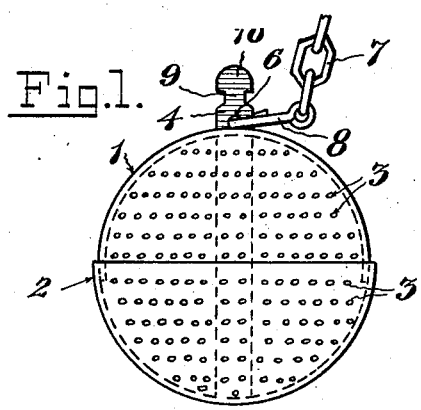
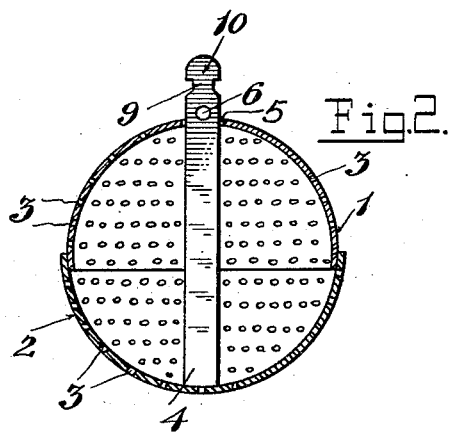
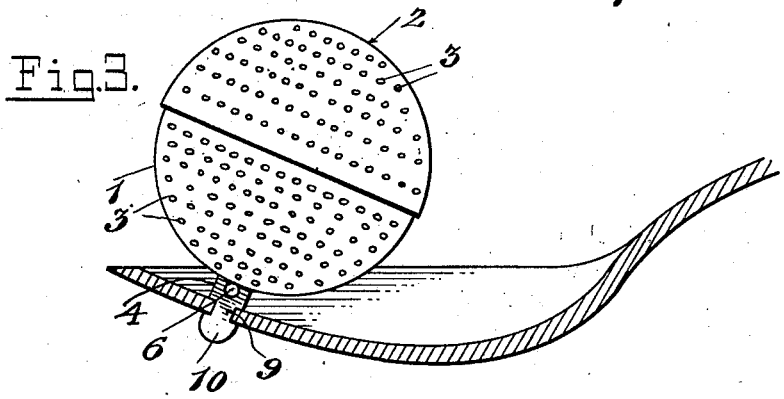
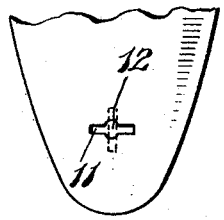
INVENTOR
Henry Cowan
BY
his ATTORNEY

UNITED STATES PATENT OFFICE.

HENRY COWAN, OF NEW YORK, N. Y.

TEA-BALL.

1,313,582.   Specification of Letters Patent.   Patented Aug. 19, 1919.

Application filed May 13, 1919. Serial No. 296,759.

*To all whom it may concern:*

Be it known that I, HENRY COWAN, a citizen of the United States, and resident of the city, county, and State of New York, have invented a certain new and useful Improvement in Tea-Balls.

This invention relates to a device suitable for use in making tea or other beverages, particularly in small quantities, such as in cups, and the object of this invention is to provide a small device in which tea is placed which may be readily hung or held in a cup or other small container, so that the tea may be readily and expeditiously made.

A further object of this invention is to provide a device of this character, which will be readily and economically constructed which will fulfil all the requirements of an appliance of this kind.

With these and other objects which may hereinafter appear, in view, I have devised the arrangement of parts hereinafter set forth, and more particularly pointed out in the claims appended hereto.

In the drawing forming a part hereof

Figure 1 is a side elevation of my improved tea ball, provided with a chain for suspending the same in a receptacle;

Fig. 2 is a vertical cross sectional view of the structure shown in Fig. 1;

Fig. 3 is a side elevation, partly in section, of my improved tea ball, as applied to a spoon, and showing the manner in which the same may be so attached when it is desired to use the device for stirring; and Fig. 4 is a plan view of a portion of the lower face of the spoon.

Throughout the various views of the drawings, similar reference characters designate similar parts.

In the preferred embodiment of my invention, as disclosed in the accompanying drawing, the device consists of a hollow body which is composed of two parts or halves 1 and 2, and these parts are provided with a plurality of perforations 3, through which the water may enter and gain access to the tea contained within the ball. The part 1 snugly fits within the mouth of the part 2, and thus the two parts are frictionally united to form a hollow, spherical, perforated body. I have shown this hollow perforated body as being spherical in shape, but it will be obvious that the same may be of any desired formation, and may be made in many ornamental shapes, sizes, and forms, as may be desired.

Secured to the inner side of the half 2, and extending upwardly therefrom is an elongated strip of material 4. This strip 4 extends through an opening 5 in the half 1. On its upper end the strip 4 is provided with a perforation 6, which is placed slightly above the face of the half 1 when the two halves 1 and 2 are united, as shown in Fig. 2. When desired, a chain 7 may be used to suspend the ball in a cup or other receptacle and this chain is provided at its end with a suitable hook or other engaging device 8, which passes through the perforation 6, strip 4, and tends to prevent a separation of the parts 1 and 2 as long as it remains in the perforation 6. When removed, the two parts may be readily separated to fill the ball with tea. Above the perforation, the strip 4 is provided with a narrow portion 9 and head 10. These parts are used to connect and hold the tea ball to a spoon or other utensil when desired. In order to receive the strip 4, the spoon or other device to which the ball is adapted to be attached, is provided near its front end with a slot 11 which has an enlarged central opening 12. To attach the ball to the spoon, the strip 4 is held in the same plane as the slot, and is passed through the same. The narrow portion 9 on the end of the strip 4 permits a rotation or turning movement of the strip within the slot 11, so that the strip can assume a position at right angles to the slot 11, as shown in dotted lines in Fig. 4, and thus the strip will not fall out of the slot until manually turned so that it can be withdrawn.

When the device is attached to the spoon, as shown in Fig. 3, it can readily be held in a cup or other receptacle, and used with a stirring movement, or when desired, the chain attachment can be used in place of the spoon, and the ball is then suspended or held in the receptacle. When the ball is attached to a spoon or other utensil, the frictional engagement of the two parts 1 and 2 is sufficient to hold these two parts together and prevent inadvertent separation thereof.

From the foregoing, it is obvious that my invention is not to be restricted to the exact embodiment herein shown, but is broad enough to cover all structures coming within the scope of the annexed claims.

Having described my invention, what I claim is:

1. An article of the class described, comprising a hollow perforated body, formed of two parts detachably connected together, an extension on one of said parts extending through the other part and projecting beyond the plane of the same, and means engaging said projecting part to hold the two parts of said body detachably united.

2. An article of the class described, comprising a hollow perforated body, composed of two halves detachably united, a projecting member on one of said parts extending through an opening in the other part, and having a portion projecting beyond the plane of said other part, a perforation in said projecting portion, and means for entering said projection and adapted to hold the two halves of the device together.

3. An article of the class described, comprising a hollow perforated body having two halves adapted to be frictionally united, a projection on the inner face of one of said halves, the other half having an opening through which said projection extends, a perforation in said projection, suspending means for the body and means on said suspending means adapted to engage said perforation and prevent separation of the two halves of the body.

4. An article of the class described, comprising a spherical hollow perforated body composed of two halves, adapted to be detachably united, a projecting strip on one of said halves, the other half having an opening through which said strip extends and projects beyond the plane of the same, a perforation in said strip beyond the plane of the body, and a suspending chain having a hook adapted to enter said perforation and hold the two halves of the body united.

5. An article of the class described, comprising a hollow perforated body formed of two parts, a projection on one of said parts adapted to pass through the other part and project beyond the same, a narrowed portion on said projecting portion and an enlarged head on said portion, said narrowed portion and enlarged head providing means for engaging a spoon or other article.

Signed at the city, county and State of New York, this 5th day of May, 1919.

HENRY COWAN.

Copies of this patent may be obtained for five cents each, by addressing the "Commissioner of Patents, Washington, D. C."